United States Patent [19]
Bülow et al.

[11] Patent Number: 6,024,781
[45] Date of Patent: Feb. 15, 2000

[54] SEPARATION OF CARBON DIOXIDE AND HYDROCARBONS

[75] Inventors: Martin Bülow, Basking Ridge; Chang Jie Guo, Bridgewater; Dongmin Shen, Chatham; Frank R. Fitch, Bedminster; Arthur I. Shirley, Piscataway; Alberto I. La Cava, Guttenberg, all of N.J.; Silvia Beatriz Dougill, London; Jonathan Paul Brooks, Godalming, both of United Kingdom

[73] Assignee: The BOC Group, Inc., Murray Hill, N.J.

[21] Appl. No.: 09/062,338

[22] Filed: Apr. 17, 1998

[51] Int. Cl.[7] ................... B01D 53/04; B01D 53/047
[52] U.S. Cl. ................ 95/101; 95/105; 95/139; 95/902
[58] Field of Search ............... 95/96–106, 114, 95/115, 139, 902, 903

[56] References Cited

U.S. PATENT DOCUMENTS

| | | | |
|---|---|---|---|
| 3,078,637 | 2/1963 | Milton | 95/139 |
| 3,078,638 | 2/1963 | Milton | 95/139 |
| 3,225,516 | 12/1965 | Smith et al. | 95/139 X |
| 3,266,221 | 8/1966 | Avery | 95/139 X |
| 3,751,878 | 8/1973 | Collins | 95/139 X |
| 3,785,122 | 1/1974 | Yatsurugi et al. | 95/902 X |
| 3,982,912 | 9/1976 | Yatsurugi et al. | 95/139 X |
| 4,056,370 | 11/1977 | Heinze et al. | 95/139 X |
| 4,581,044 | 4/1986 | Uno et al. | 95/139 X |
| 4,627,857 | 12/1986 | Sutt, Jr. | 95/139 X |
| 4,629,476 | 12/1986 | Sutt, Jr. | 95/139 X |
| 4,726,815 | 2/1988 | Hashimoto et al. | 95/139 X |
| 4,769,047 | 9/1988 | Dye | 95/139 X |
| 4,775,394 | 10/1988 | Yamano et al. | 95/139 X |
| 4,775,396 | 10/1988 | Rastelli et al. | 95/902 X |
| 4,790,859 | 12/1988 | Marumo et al. | 95/139 X |
| 4,810,266 | 3/1989 | Zinnen et al. | 95/903 X |
| 4,917,711 | 4/1990 | Xie et al. | 55/68 |
| 5,156,657 | 10/1992 | Jain et al. | 55/26 |
| 5,365,011 | 11/1994 | Ramachandran et al. | 585/829 |
| 5,518,527 | 5/1996 | Tomizuka et al. | 95/903 X |
| 5,531,808 | 7/1996 | Ojo et al. | 95/139 X |
| 5,728,198 | 3/1998 | Acharya et al. | 95/139 X |

FOREIGN PATENT DOCUMENTS 0898321  6/1962  United Kingdom ............ 95/139

OTHER PUBLICATIONS

Journal of the American Chemical Society vol. 78, Dec. 8, 1956—No. 23—Physical and Inorganic Chemistry—Crystalline Zeolites I. The Properties of a New Synthetic Zeolite, Type A By D.W. Breck, W.G. Eversole, R.M. Milton, T.B. Reed and T.L. Thomas.

*Primary Examiner*—Robert H. Spitzer
*Attorney, Agent, or Firm*—Philip H. Von Neida; Salvatore P. Pace

[57] ABSTRACT

Carbon dioxide is separated from gaseous hydrocarbons by a cyclic adsorption process using at a temperature in the range of about −50 to about 200° C., wherein the adsorption step of the process is conducted by passing the gas mixture through an adsorption zone containing carbon molecular sieve or type A zeolite whose exchangeable cations are made up of about 50 to about 90% sodium ions and about 10 to about 50 percent potassium ions.

28 Claims, 1 Drawing Sheet

SEPARATION OF CARBON DIOXIDE AND HYDROCARBONS

FIELD OF THE INVENTION

This invention relates to the separation of carbon dioxide from other gases, and more particularly to the separation of carbon dioxide from gaseous hydrocarbons by adsorption. Specifically, the invention relates to the separation of carbon dioxide from gaseous alkanes, alkenes and alkynes having 1 to 6 carbon atoms by pressure swing adsorption (PSA), temperature swing adsorption (TSA) or concentration swing adsorption (CSA) using potassium-modified 4A zeolite adsorbent.

BACKGROUND OF THE INVENTION

It is known to separate carbon dioxide from other gases by adsorption. For example, U.S. Pat. No. 5,156,657 discusses the removal of water vapor and carbon dioxide from air by PSA and TSA. Similarly, it is known to separate alkenes from alkanes by adsorption. U.S. Pat. No. 4,917,711 describes the adsorption of an alkene from a mixture containing the alkene and an alkane using an adsorbent comprising a copper compound and a high surface area support such as silica gel or zeolite molecular sieves, such as 4A zeolite, 5A zeolite, type X zeolite or type Y zeolite.

U.S. Pat. No. 5,365,011 describes the separation of alkenes having 2 to 6 carbon atoms from alkanes having 2 to 6 carbon atoms by pressure swing adsorption at temperatures in the range of about 50 to about 200° C. using 4A zeolite. The 4A zeolite may have up to 25% of its exchangeable sodium ions replaced by other ions, including potassium ions, calcium ions, strontium ions, etc., provided that the presence of the other ions does not cause the 4A character of the adsorbent to change.

Breck et al, "The Properties of a New Synthetic Zeolite, Type A", Journal of the American Chemical Society, Vol. 78, Number 23, 1956, pp. 5963–5977, describes the adsorption of carbon dioxide and various hydrocarbons using partially potassium-exchanged type 4A zeolite.

Because of the importance of adsorption as a method of separating carbon dioxide from other gases, including hydrocarbons, adsorbents having enhanced carbon dioxide-adsorption properties are continuously sought. This invention discloses the use of a class of type A zeolites for effective separation of carbon dioxide from gaseous hydrocarbons.

SUMMARY OF THE INVENTION

According to a broad embodiment, the invention is a method of separating carbon dioxide from a gas mixture by a cyclic adsorption process comprising the steps:

(a) passing said gas mixture through at least one adsorption zone containing type A zeolite whose exchangeable cations include about 40 to about 90% sodium ions, about 10 to about 50% potassium ions and about 0 to about 10% other ions, the other ions being selected from Group IA ions other than sodium ions and potassium ions, Group IB ions, Group IIA ions, Group IIIA ions, Group IIIB ions, ions of the lanthanide series and mixtures of these; carbon molecular sieve; or mixtures of these, thereby adsorbing at least part of the carbon dioxide from the gas mixture and producing a carbon dioxide-depleted gas; and (b) regenerating the adsorbent, thereby producing a carbon dioxide-enriched gas.

In a preferred embodiment, the adsorbent is type A zeolite having, as its exchangeable cations, about 40 to about 90% sodium ions, about 10 to about 50% potassium ions and about 0 to about 10% other ions selected from Group IA ions, Group IB ions, Group IIA ions, Group IIIA ions, Group IIIB ions, lanthanide series ions and mixtures of these.

In another preferred embodiment, the cyclic adsorption process is pressure swing adsorption, temperature swing adsorption or a combination of these.

In another preferred embodiment, step (a) is carried out at a temperature in the range of about −50 to about 200° C. In another preferred embodiment, step (a) is carried out at a pressure in the range of about 1 to about 120 bara (bar absolute). In a preferred aspect of these preferred embodiments, the cyclic adsorption process is pressure swing adsorption and step (b) is carried out at a pressure in the range of about 0.15 to about 5 bara. In another preferred aspect of these preferred embodiments, the cyclic adsorption process is temperature swing adsorption and step (b) is carried out at a temperature in the range of about 100 to about 300° C.

The invention is ideally suited for the separation of carbon dioxide from hydrocarbons, particularly hydrocarbons containing 1 to 6 carbon atoms, and is especially suitable for the separation of carbon dioxide from alkanes, alkenes, alkynes and mixtures of these, particularly from alkanes, alkenes, alkynes and mixtures thereof containing 2 to 4 carbon atoms, such as ethane, propane, ethene, propene, acetylene or mixtures of these.

When the hydrocarbon is an alkyne, it is preferred that the adsorbent be type A zeolite having as its exchangeable cations, about 55 to about 65% sodium ions and about 35 to about 45% potassium ions. In this case, it is likewise preferred that step (a) be carried out at a temperature in the range of about −50 to about 60° C.

The method of the invention is particularly suited for the separation of carbon dioxide from ethyne. In this case, it is preferred to carry out step (a) at a temperature in the range of about 0 to about 50° C.

When the hydrocarbon is an alkane, an alkene or mixtures of these, it is preferred that the adsorbent be type A zeolite having as its exchangeable cations, about 50 to about 85% sodium ions, about 15 to about 45% potassium ions and about 0 to about 5% ions selected from said other ions. In this case it is likewise preferred that step (a) be carried out at a temperature in the range of about 70 to about 160° C. More preferably, in this embodiment the type A zeolite has as its exchangeable cations, about 60 to about 80% sodium ions, about 20 to about 40% potassium ions. In a most preferred aspect of this embodiment of the invention, substantially all exchangeable cations associated with the type A zeolite are sodium and potassium ions.

In a more preferred aspect of the broad embodiment of the invention, the cyclic adsorption process is pressure swing adsorption and step (a) is carried out at a pressure in the range of about 1 to about 25 bara and step (b) is carried out at a pressure in the range of about 0.2 to about 2 bara.

When the cyclic adsorption process is pressure swing adsorption, it is preferred that step (b) be at least partly carried out by evacuating said adsorption zone.

In another preferred embodiment of the invention, step (b) is at least partly carried out by purging the adsorption zone with carbon dioxide-depleted gas. In another preferred embodiment, the adsorption zone is purged with carbon dioxide-enriched gas prior to step (b). Yet another preferred embodiment comprises at least partly repressurizing said adsorption zone with carbon dioxide-depleted gas after step (b).

DETAILED DESCRIPTION OF THE INVENTION

Figure 1:
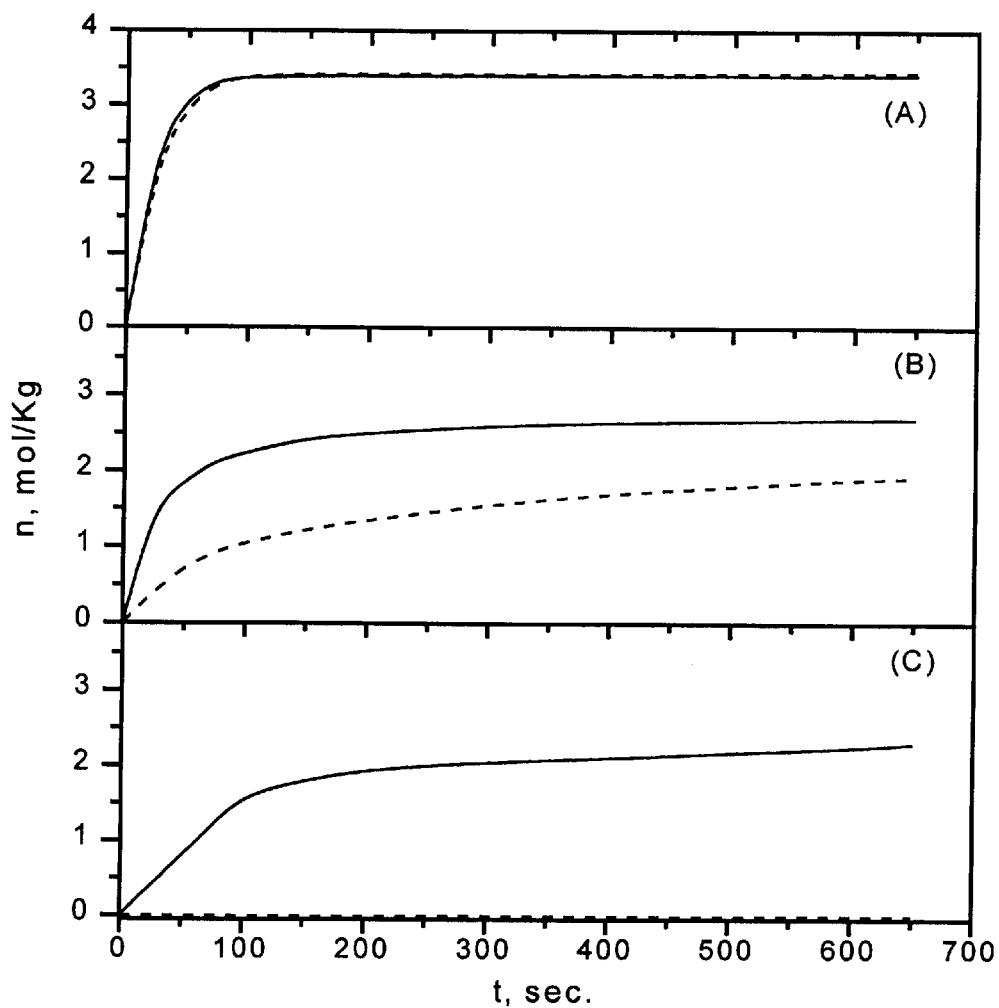
FIG. 1 shows carbon dioxide-acetylene gas separation curves using various type A-derived zeolites.

The invention is useful for the separation of carbon dioxide from gaseous hydrocarbons such as alkanes, alkenes and alkynes. As used in this specification the terms alkane, alkene and alkyne have their usual meaning under the IUPAC rules. Thus, alkanes include straight-chain and branched-chain saturated hydrocarbons, alkenes include straight-chain and branched-chain ethylenically unsaturated hydrocarbons and alkynes include straight-chain and branched-chain acetylenically unsaturated hydrocarbons. Typical alkanes are methane, ethane, propane, the butanes, e. g. butane, 2-methyl propane, the pentanes and the hexanes, e.g. 2-ethyl butane, etc., typical alkenes are ethene, propene, the butenes, e.g. butene-1, butene-2, 2-methyl propene, the pentenes and hexenes. Typical alkynes include ethyne, i.e., acetylene, propyne, butyne, etc. The invention is particularly suitable for separating carbon dioxide from ethyne.

The separation is effected by a cyclic adsorption process using an adsorbent which more readily adsorbs carbon dioxide than hydrocarbons at the adsorption temperature and pressures employed. Typical cyclic adsorption processes that can be used to effect the separations of the invention include PSA, in which the adsorption step of the process is carried out at a relatively high pressure and adsorbent regeneration is carried out at a relatively low pressure; TSA, in which the adsorption is carried out at relatively low temperatures and adsorbent regeneration is carried out at relatively high temperatures; and CSA, in which the adsorbent regeneration step is carried out by reducing the concentration of sorbed gas in the adsorbent by purging the adsorbent with a nonadsorbed or weakly adsorbed, such as the nonadsorbed gas product of the process. Combinations of these processes can also be used. For example, the adsorbent can be purged with nonadsorbed gas during the regeneration step of PSA and TSA processes. Details of these processes are well known and form no part of the invention.

The adsorption cycle used in the invention may include steps other than the basic steps described above. For example, PSA cycles may include one or more bed equalization steps, a nonadsorbed product backfill step, a countercurrent nonadsorbed product purge step and a cocurrent desorbed product gas purge step at or below the desired adsorption pressure. The cocurrent purge generally precedes the evacuation step, and is generally carried out before depressurizing the adsorption vessel, although it could be carried out after any cocurrent depressurization steps, e.g. equalization steps. Countercurrent purge is generally carried out during or after countercurrent evacuation of the adsorption vessel. The sequential order and duration of the various steps are not critical, and these may be varied, as desired. Similarly, the adsorbent may be purged with nonadsorbed gas during the adsorbent regeneration step of TSA cycles.

The process of the invention can be carried out in a system comprising a single adsorption unit or a battery of adsorption units operated in phase, or a plurality of adsorption units or batteries of adsorption units operated out of phase, whichever is desired. When a system comprising a single adsorption unit or a battery of units all of which are operated in phase is used, the adsorption step must be periodically stopped to permit regeneration of the adsorbent bed(s), whereas when a plurality of adsorption units are employed in parallel and operated out of phase, one or more units can be in adsorption service adsorbing the desired gas component, while one or more other units are undergoing regeneration to desorb and collect the adsorbed gas component. Operation of the adsorption systems of the invention is cyclical. In the preferred adsorption process, cycles are repeatedly carried out in a manner such that production of the desired product gas is substantially continuous. In preferred embodiments the process is carried out in a twin bed system comprising a pair of adsorption vessels arranged in parallel and operated 180° out of phase, with each vessel being packed with the novel adsorbent of the invention In one embodiment of the invention, the adsorbent is a sodium- and potassium-exchanged type A zeolite about 50 to 90% of whose exchangeable cation sites are occupied by sodium ions, about 10 to about 50% of whose exchangeable cation sites are occupied by potassium ions and 0 to about 10% of whose exchangeable cation sites are occupied by ions other than sodium and potassium ions. The specific amount of exchangeable cation sites occupied by potassium ions will depend upon the composition of the gas being separated. When it is desired to separate carbon dioxide from alkanes and alkenes, the minimum percentage of available cation sites occupied by potassium sites is generally about 10%, is preferably about 15% and is most preferably about 20%, and the maximum percentage of available sites occupied by potassium sites is generally about 50%, is preferably about 45% and is most preferably about 40%. When it is desired to separate carbon dioxide from alkynes, the minimum percentage of available cation sites occupied by potassium sites can be as low as about 10%, but is preferably at least about 25% and is most preferably about 35%, and the maximum percentage of available sites occupied by potassium sites is generally about 50% and is preferably about 45%.

When ions other than sodium and potassium ions occupy exchangeable cation sites, they do not occupy more than about 10%, and preferably not more than about 5% of the sites. Such other ions include Group IA ions other than sodium and potassium, e.g. lithium ions, Group IB ions, e.g. copper I ions, silver I ions, etc., Group IIA ions, e.g. calcium ions, magnesium ions, strontium ions, etc., Group IIIA ions, e.g. aluminum ions, Group IIIB ions, e.g. gallium ions, and ions of the lanthanide series.

Cation sites not occupied by potassium sites and the other ions mentioned above are occupied by sodium sites. Type A zeolites for use in the separation of carbon dioxide from alkanes and alkenes are those in which about 50 to 90, preferably about 55 to about 85 and most preferably about 60 to 80% of the cation sites are occupied by sodium ions. Type A zeolites for use in separating carbon dioxide from alkynes can have about 50 to 90% of its cation sites occupied by sodium ions, but preferably have about 55 to 75% and most preferably have about 55 to about 65% of their exchangeable cation sites occupied by sodium ions.

In another embodiment of the invention, the adsorbent is carbon molecular sieve. This embodiment is particularly useful for the separation of carbon dioxide from alkynes, such as acetylene.

The temperature at which the adsorption step of the cyclic adsorption process of the invention is carried out depends upon a number of factors, such as the particular hydrocarbons present in the gas mixture being separated, the particular adsorbent being used and the pressure at which the adsorption step is carried out. In general, the adsorption step is carried out at a minimum temperature of about 0° C., preferably at a minimum temperature of about 50° C. and most preferably at a minimum temperature of about 70° C., when carbon dioxide is being separated from alkanes, alkenes or mixtures of these, and is carried out at a minimum temperature of about −50° C., preferably at a minimum temperature of about 0° C., and most preferably at a minimum temperature of about 20° C., when carbon dioxide is being separated from alkynes. The upper temperature limit at which the adsorption step of the process is carried out is determined by both economics and the chemical reactivity of the hydrocarbon. In general, the adsorption step can be carried out at a temperature below the temperature at which the hydrocarbon from which the carbon dioxide is being separated undergoes chemical reaction, e.g. oligomerization and polymerization. In general, the adsorption step of the process can be carried out at temperatures up to about 200° C., but preferably does not exceed about 160° C. when separating carbon dioxide from alkanes and/or alkenes and preferably does not exceed about 100, and most preferably does not exceed about 60° C. when carbon dioxide is being separated from alkynes.

The pressures at which the adsorption and adsorbent regeneration steps are carried out are not critical, and in general, these steps can be carried out at any of the usual pressures employed for gas adsorption processes. As noted above, the pressure at which the adsorption step is carried out is typically in the range of about 1 to about 120 bara, and this step is preferably carried out at pressures in the range of about 1 to about 25 bara. For PSA processes the adsorbent regeneration step is typically carried out at pressures in the range of about 1.5 to about 5 bara and this step is preferably carried out at pressures in the range of about 0.2 to about 2 bara; and for TSA processes the adsorbent regeneration step is carried out at a temperature higher than the adsorption temperature and below the temperature at which undesired reactions take place in the adsorption vessel. For TSA processes, the adsorbent regeneration temperature is typically in the range of about 100 to about 300° C., and is preferably in the range of about 150 to about 250° C. Operation conditions for PSA, TSA and CSA processes used in the invention are well known and, in general, form no part of this invention.

It will be appreciated that it is within the scope of the present invention to utilize conventional equipment to monitor and automatically regulate the flow of gases within the system so that it can be fully automated to run continuously in an efficient manner.

Figure 2:
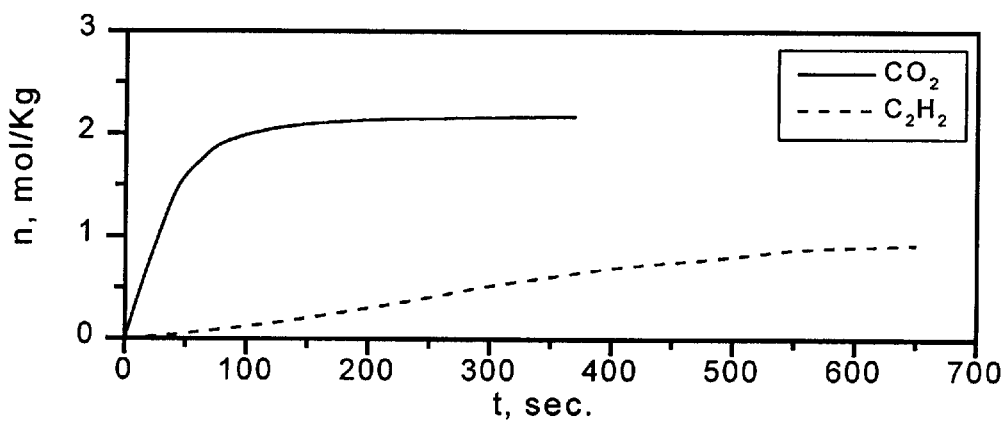
FIG. 2 shows a carbon dioxide-acetylene gas separation curve using carbon molecular sieve adsorbent.

The invention is further illustrated by the following examples in which, unless otherwise indicated, parts, percentages and ratios are on a volume basis. The curves shown in FIGS. 1 and 2 show the carbon dioxide-acetylene separation properties of the adsorbents used in the examples. In each set of curves the solid line represents the carbon dioxide uptake run and the dashed line represents the acetylene uptake run.

EXAMPLE 1

A sample of 4A zeolite adsorbent was activated in situ by heating the zeolite under a vacuum to 350° C. over a period of three hours in a laboratory furnace and then maintaining the zeolite at 350° C. for an additional three hours at a pressure of $10^{-2}$ torr. The zeolite sample was then cooled and kinetic uptake measurement runs were made at 25° C. for carbon dioxide and acetylene on the zeolite with a volumetric High Pressure Analyzer (HPA) manufactured by VTI, Florida. The kinetic measurements were performed as follows: The initial pressure in the adsorption vessel was about $10^{-2}$ torr. The gas sample was admitted into the system and maintained at a pressure of 800 torr. The volume of gas adsorbed (in cc STP) by the zeolite was monitored by an online computer, and the amount of gas adsorbed (in moles per kg of zeolite) was plotted as a function of time. The results are plotted in FIG. 1 as curve set (A). As is illustrated, the rate of sorption uptake for both carbon dioxide and acetylene on 4A zeolite were rapid and similar, and the amount adsorbed at equilibrium for each gas was similar. This example shows that 4A zeolite adsorbent cannot be used for kinetic or equilibrium-based separation of carbon dioxide and acetylene.

EXAMPLE 2

Example 1 was repeated except that the 4A zeolite was replaced by sodium- and potassium-exchanged type A zeolite (NaKA zeolite) having 23.5% of its exchangeable cation sites occupied by potassium ions (NaK(23.5%)A zeolite). The results are plotted in FIG. 1 as curve set (B). The kinetics of sorption uptake for both carbon dioxide and acetylene on NaK(23.5%)A zeolite was slower than that obtained using 4A zeolite, but to quite different extents, as shown in (B). The uptake rate and amount adsorbed for acetylene were significantly less than those for carbon dioxide. This example shows that NaK(23.5%)A zeolite possesses very good equilibrium and kinetic selectivity for carbon dioxide compared to acetylene.

EXAMPLE 3

Example 1 was repeated except that the 4A zeolite was replaced by NaKA zeolite having 39.5% of its exchangeable cation sites occupied by potassium ions (NaK(39.5%)A zeolite). The results are plotted in FIG. 1 as curve set (C). The kinetics of sorption uptake for both carbon dioxide and acetylene on NaK(39.5%)A zeolite was again slower than that obtained using 4A zeolite, but the differences between the uptake rates and amounts adsorbed of the various gas species was much greater than that obtained in Example 2. In fact, there is substantially no adsorption of acetylene on NaK(39.5%)A zeolite, whereas the uptake rate and amount adsorbed for carbon dioxide are considerable. This example shows that NaK(39.5%)A zeolite exhibits very good sorption equilibrium concentration and fast sorption kinetics for carbon dioxide, but it excludes acetylene as a result of a molecular sieving process.

It can be seen from the above examples that 4A zeolite cannot be used to separate carbon dioxide from acetylene, NaK(23.5%)A zeolite can be used for equilibrium-based or kinetic-based separation of these gases, and NaK(39.5)A zeolite can be used for the molecular sieving separation of these gases.

EXAMPLE 4

Example 1 was repeated except that the adsorbent used in this example was carbon molecular sieve (CMS) adsorbent, manufactured by Kuraray, Japan. The CMS adsorbent was activated by heating it from ambient temperature to 250° C. in a laboratory furnace under a pressure of about $10^{-2}$ torr over a period of two hours. The CMS adsorbent was then maintained at 250° C. for another two hours under a pressure of $10^{-2}$ torr. Kinetic measurements were carried out at 25°

C. in the manner described in Example 1. The results are plotted in FIG. 2.

Example 4 shows that CMS provides very good kinetic separation of carbon dioxide and acetylene.

Although the invention has been described with particular reference to specific embodiments and to specific experiments, these features are merely exemplary of the invention and variations are contemplated. For example, various Na- and K-exchanged type A zeolites having potassium exchange levels in the range of about 10 to about 50% can be used to separate carbon dioxide from other hydrocarbons. The scope of the invention is limited only by the breadth of the appended claims.

What is claimed is:

1. A method of separating carbon dioxide from a gas mixture by a cyclic adsorption process comprising the steps:

(a) passing said gas mixture through at least one adsorption zone containing an adsorbent selected from the group consisting of type A zeolite having as its exchangeable cations, about 40 to about 90% sodium ions, about 10 to about 50% potassium ions and about 0 to about 10% other ions selected from the group consisting of Group IA ions, Group IB ions, Group IIA ions, Group IIIA ions, Group IIIB ions, lanthanide series ions and mixtures of these; thereby adsorbing at least part of the carbon dioxide from said gas mixture and producing a carbon dioxide-depleted gas; and (b) regenerating said adsorbent, thereby producing a carbon dioxide-enriched gas.

2. The method of claim 1, wherein said cyclic adsorption process is selected from pressure swing adsorption, temperature swing adsorption and a combination of these.

3. The method of claim 2, wherein step (a) is carried out at a temperature in the range of about −50 to about 200° C.

4. The method of claim 3, wherein step (a) is carried out at a pressure in the range of about 1 to about 120 bara.

5. The method of claim 4, wherein said gas mixture comprises carbon dioxide and at least one gaseous hydrocarbon.

6. The method of claim 5, wherein said hydrocarbon contains 1 to 6 carbon atoms.

7. The method of claim 6, wherein said hydrocarbon comprises alkanes, alkenes, alkynes and mixtures of these.

8. The method of claim 7, wherein said hydrocarbon contains 2 to 4 carbon atoms.

9. The method of claim 8, wherein said hydrocarbon is ethane, propane, ethene, propene, acetylene or mixtures of these.

10. The method of claim 8, wherein said hydrocarbon is an alkyne.

11. The method of claim 10, wherein the adsorbent is type A zeolite and, of the exchangeable cation sites associated with said zeolite, about 55 to about 65% are sodium ions and about 35 to about 45% are potassium ions.

12. The method of claim 11, wherein step (a) is carried out at a temperature in the range of about 0 to about 60° C.

13. The method of claim 12, wherein said alkyne is ethyne or propyne.

14. The method of claim 13, wherein step (a) is carried out at a temperature in the range of about 20 to about 60° C.

15. The method of claim 8, wherein said hydrocarbon is an alkane, an alkene or mixtures of these.

16. The method of claim 15, wherein said adsorbent is type A zeolite having as its exchangeable cations, about 50 to about 85% sodium ions, about 15 to about 45% potassium ions and about 0 to about 5% ions selected from said other ions.

17. The method of claim 16, wherein step (a) is carried out at a temperature in the range of about 70 to about 160° C.

18. The method of claim 17, wherein said adsorbent is type A zeolite having as its exchangeable cations, about 60 to about 80% sodium ions and about 20 to about 40% potassium ions.

19. The method of claim 8, wherein said cyclic adsorption process is pressure swing adsorption and step (a) is carried out at a pressure in the range of about 1 to about 25 bara and step (b) is carried out at a pressure in the range of about 0.2 to about 2 bara.

20. The method of claim 19, wherein step (b) is at least partly carried out by purging said adsorption zone with carbon dioxide-depleted gas.

21. The method of claim 19, further comprising purging said adsorption zone with carbon dioxide-enriched gas prior to step (b).

22. The method of claim 6, wherein said adsorbent is type A zeolite, and substantially all exchangeable cations associated with said type A zeolite are sodium and potassium ions.

23. The method of claim 4, wherein said cyclic adsorption process is pressure swing adsorption and step (b) is carried out at a pressure in the range of about 0.15 to about 5 bara.

24. The method of claim 23, wherein step (b) is at least partly carried out by depressurizing said adsorption zone.

25. The method of claim 23, further comprising at least partly repressurizing said adsorption zone with carbon dioxide-depleted gas after step (b).

26. The method of claim 4, wherein said cyclic adsorption process is temperature swing adsorption and step (b) is carried out at a temperature in the range of about 100 to about 300° C.

27. The method of claim 1, wherein step (b) is at least partly carried out by purging said adsorption zone with carbon dioxide-depleted gas.

28. The method of claim 1, further comprising purging said adsorption zone with carbon dioxide-enriched gas prior to step (b).

* * * * *